M. A. MARTIN.
COUPLING DEVICE.
APPLICATION FILED OCT. 9, 1911.

1,167,832.

Patented Jan. 11, 1916.
2 SHEETS—SHEET 1.

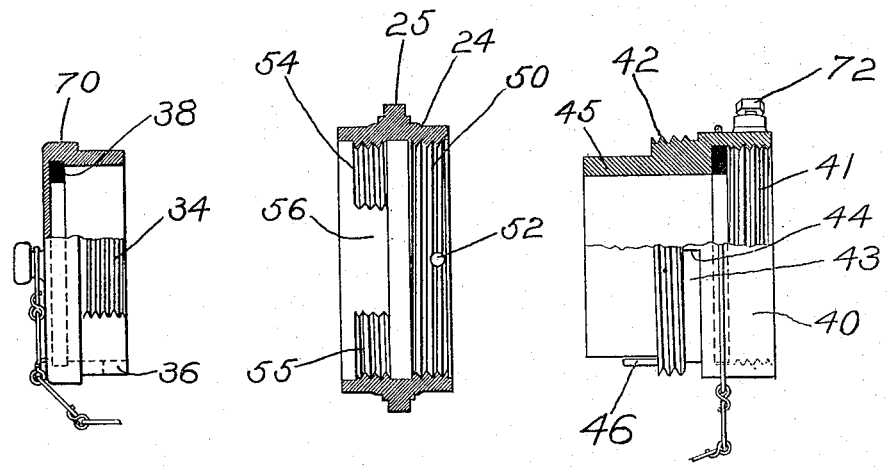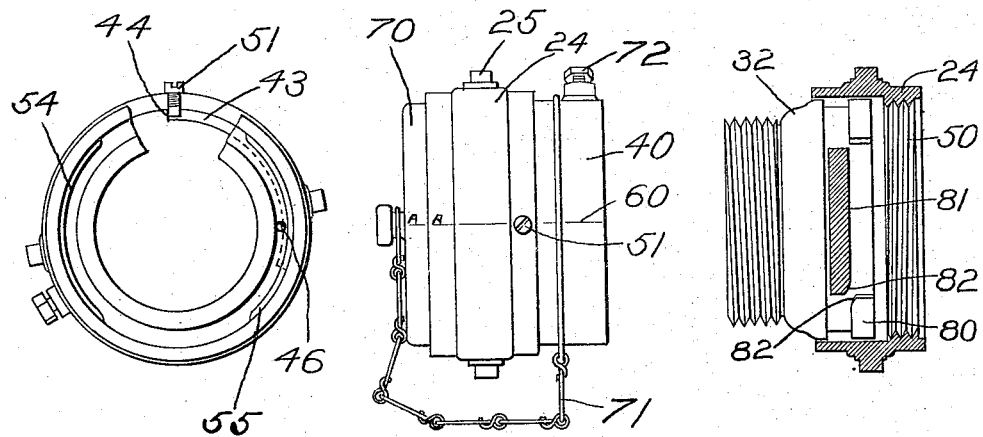

UNITED STATES PATENT OFFICE.

MORRIS A. MARTIN, OF DAYTON, OHIO.

COUPLING DEVICE.

1,167,832.   Specification of Letters Patent.   Patented Jan. 11, 1916.

Application filed October 9, 1911. Serial No. 653,586.

*To all whom it may concern:*

Be it known that I, MORRIS A. MARTIN, residing at Dayton, Montgomery county, Ohio, have invented certain new and useful Improvements in Coupling Devices, of which the following is a full, clear, and exact description.

This invention relates to improvements in coupling devices for coupling together two adjacent parts, and is more particularly designed by me for use as a hose coupling to couple together the two ends of sections of hose or to couple one end of a hose section to the hydrant. But it is to be understood that the invention is applicable to other uses as a coupling device. For example, it is often times desired to have a tight form of closure for bottles or other receptacles, in which case the present invention could be made use of to couple the cap or similar device to the opening of the receptacle. As a further example of such use, the invention may be applicable to the cap of automobile radiators where it is desired to close the opening quickly and securely by means of the cap.

It is among the general objects to provide such a form of coupling as will enable the two parts to be coupled together with great secureness and also with rapidity. This becomes particularly important in case of couplings for fire hose where it is highly desirable to have a very secure coupling between the hose sections in order to prevent leaks and also where speed in coupling is an important element.

With these and incidental objects in view, the invention constitutes in certain novel combinations and arrangements of parts, a preferred form of embodiment of which is shown in the accompanying drawings forming a part of this specification.

Figures 2, 3:
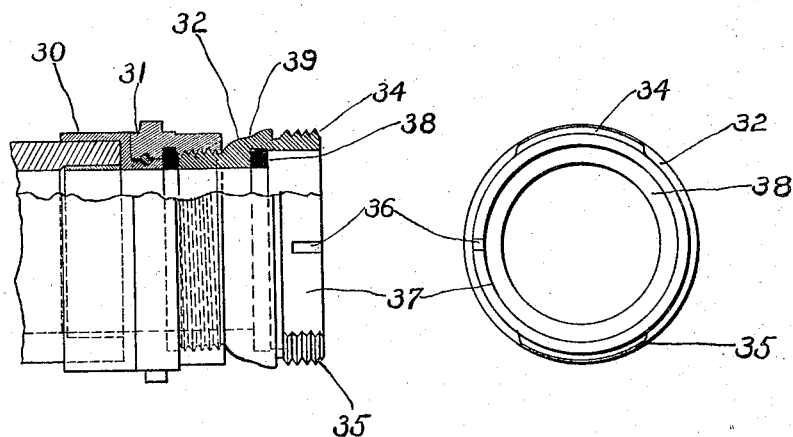
Figure 1:
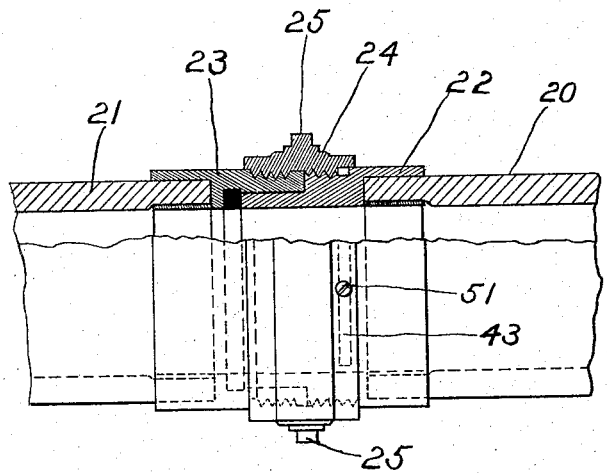

In said drawings Figure 1 represents a side view partly sectionalized of two sections of hose coupled together by this device; Fig. 2 is another side view partly sectionalized of one end of a hose section into which is screwed one member of the coupling device; Fig. 3 is an end view of the part shown in Fig. 2, looking from the right-hand side of Fig. 2; Fig. 4 is a side elevation of the coupling device shown as applied to a hydrant pipe, with a cap attached to form a closure in the absence of the other hose section; Fig. 5 is an end view of Fig. 4 looking from the left of Fig. 4, but with the cap removed, and also partly broken away to show the set-screw which serves as an alining device; Fig. 6 is a partly sectionalized side view of the aforesaid cap; Fig. 7 is a cross-sectional view through the locking collar or slip-lock as it may be called; Fig. 8 is a partly sectionalized side view of the other coupling member, with the locking collar removed; Fig. 9 is a modified form of interlocking device for the coupling improvement.

Referring to Fig. 1, 20 and 21 represent two opposite sections of hose that are to be coupled together. For convenience I will refer to these improvements as particularly concerning the coupling of hose, it being understood of course that the improvements are nevertheless applicable to other uses.

Firmly attached to the hose section 20 is the first coupling member 22, and to the hose section 21 the second coupling member 23. This coupling is effected by means of a locking collar or slip-lock 24. As will presently be seen, this locking collar 24 is intended to have a revoluble movement for the purpose of drawing together the two coupling members 22 and 23. This revoluble movement of the collar is imparted thereto by means of a wrench or other suitable device which engages one or both of the lugs 25 projecting from the side of the collar.

In addition to coupling two hose sections together, the device may be used to couple a single hose to the hydrant, and for convenience I will now describe the mechanism in connection with attaching to a hydrant, referring to one of the coupling sections as the hose section or member, and the other as the hydrant section or member.

In Fig. 2 the hose 30 is shown attached by an ordinary swivel screw collar, to the hose coupling member 32, so that the hose is shown securely attached to this coupling member 32. The end view of this coupling member 32 is shown in Fig. 3, where it will be seen that the outer end thereof is formed with a pair of mutilated or segmental screw threads, which for convenience I will hereafter refer to as the interlocking threads 34 and 35. These threads are adapted to interlock with similar segmental threads on the interior of the locking collar as hereinafter explained. A notch or slot 36 is formed in the periphery of the rim 37 of this coupling member. The purpose of this slot is to engage a pin on the other coupling member so as to prevent relative turning movement between the two during the coupling or pulling together of the two members, as will presently be explained. A gasket 38 is seated in the interior of this coupling member, abutting against a shoulder 39. The purpose of this gasket is to form a water-tight fit when it is engaged by the collar of the other coupling member when the parts are coupled together.

Referring now to Fig. 8, this figure shows the other coupling member 40 which I for convenience will refer to as the hydrant member. A thread 41 is formed in one end of this hydrant member 40 so that this member may be screwed on to the projecting plug of the hydrant in the usual manner in which an ordinary hose section is now screwed on. It will be understood that as a matter of fact the projecting plug of the hydrant might be regularly formed with the devices and construction such as will be shown to be contained in this coupling member 40; but for convenience I have provided a separate coupling member so that it may be screwed on to any hydrant of the ordinary form, thus making the present improvements applicable to being attached to any hydrant without necessitating particular construction of the hydrant connecting plug. This coupling member 40 or hydrant member, has at its outer end a continuous screw thread 42 which toward its inner end terminates in a peripheral recess 43 which ends with a blocking shoulder 44. The extreme outer end of the member 40 is of smaller diameter and carries no screw thread so that it forms a projecting sleeve 45. This sleeve is the part which is adapted to abut against the other coupling member 32, as previously referred to, the outer rim of this sleeve 45 abutting against the gasket 38 to make a water-tight connection.

A pin 46 projects outwardly from the thread portion 42, along the sleeve 45, and is adapted to engage the slot 36 previously referred to in the coupling member 32, so that when the two parts are put together, the slot 36 will engage over the pin 46 and relative turning movement of the two coupling members is then impossible.

I will now describe the locking collar which is shown in Fig. 7. This locking collar 24 is formed with a regular continuous right-handed thread 50 to fit the aforesaid thread 42 of the coupling member 40. Thus the collar can be screwed on to said member 40 in the usual way by the engagement of the thread 50 with the thread 42. The engagement of these or similar parts is shown in Fig. 2 as previously referred to, except that the coupling member 22 is in that case an end of the hose section instead of a hydrant member. When the collar 24 has been screwed up to about the limit of its thread, a set-screw 51 (see Figs. 1 and 5) is screwed downward through a hole 52 (see Fig. 7) formed in the periphery of the collar 24. At this point the set-screw is in lateral alinement with the aforesaid groove 43, and by screwing down the set-screw at this point, its lower end will be in the path of contact of the shoulder 44 as shown in Fig. 5. The purpose of this construction is to limit the unscrewing movement of the collar 24. Thus the collar 24 is screwed on to the hydrant member 40 practically to its complete extent, and then may be turned backward through some quarter or other convenient fraction of a turn until the set-screw strikes the shoulder 44, thus limiting the unscrewing movement of the collar. This limitation of the unscrewing movement is of convenience in preventing the collar from being inadvertently or improperly unscrewed after once put on, but more particularly it is important in order to bring the coupling parts into certain alinement as will presently be explained, which alinement is necessary in putting the parts together preparatory for coupling. The other half of said collar 24, opposite to the screw thread 50, is formed with two internally projecting segmental screw threads 54 and 55. These segmental threads 54 and 55 are similar to the previously described segmental threads 34 and 35 shown in Figs. 2 and 3 and the two pairs of threads form interlocking elements when the coupling is effected. Assuming now that the collar 24 has been screwed to the hydrant coupling No. 40 (such for example as in the same position shown for the parts in Fig. 1), then the other coupling member or hose coupling member 32 shown in Fig. 2 is brought up to the outer portion of the collar 24 in such position that the segmental interlocking threads 34 and 35 are opposite the vacant or recess portions 56 which intervene on internal periphery of the collar 24 between the segmental projecting threads 54 and 55. Thus the turning of the locking collar 24 will now immediately cause the interlocking threads 34 and 54 also 35 and 55 to engage and interlock or be screwed together by this turning movement of the collar 25 in the right-hand direction. In the meantime the sleeve 45 has been brought into abutting position against the gasket 38, and since the said segmental threads are left-hand threads, the ordinary right-hand turning of the collar causes these left-hand threads to act to pull the coupling member 32 inward toward the other coupling member 40. Of course at the same time the revoluble movement of the collar 24 is, by reason of its thread 50, advancing inward along the thread 42 to a slight extent which acts still further to pull the coupling member 32 toward the other coupling member as this movement of pulling together these coupling members 32 and 40 is partly produced by the pitch of the right-hand threads 50 and 42 and partly by the pitch of the left-hand threads 34, 54, and 35, 55. It will thus be seen that the coupling or pulling together movement is split up between these two sets of threads, and this has some advantages over producing this connecting movement by a single set of threads, but I do not wish to be limited in the scope of my invention necessarily to the use of two sets of threads for this purpose except where particularly specified. It will be noted that one of the advantageous features of this construction is this arrangement of the mutilated or segmental threads or unlocking surfaces. That is, in the position preparatory to coupling, these unlocking surfaces are out of alinement, and in the process of coupling they are brought into alinement to couple the two elements securely together. In the case of these threads, this makes it possible to bring several engaging portions of the thread normally in alinement with each other so as to get the grip or locking action of several portions of thread rather than a single screw thread. This also enables the coupling parts to be brought together at the outset so that the collar 45 may then normally sit right against the gasket 38 and a slight turning movement of the collar 24 then produces a substantial coupling movement pulling the two members together and forcing the sleeve 45 well against the gasket 38 to prevent leakage.

It will be seen that the turning of the collar 24 might tend to turn the coupling member 32 by reason of the frictional engagement of the locking threads, and this would prevent the full efficiency of the coupling together movement. Therefore the slot and pin connection 46 and 36 is provided whereby the pin 46 entering the slot 36 prevents any revoluble movement between the coupling member 32 and the coupling member 40. Therefore the rotation of the collar 24 cannot have any turning effect upon the member 32 and the parts are susceptible merely of being pulled together with a coupling movement.

When the parts are brought together preparatory to coupling, it is therefore necessary that the segmental threads should be out of alinement with each other, as explained, and also that the pin 46 should be in position to enter the slot 36. This might be observed and prepared for by proper shifting of the parts, but it is much more convenient to have an alining or centering device. Therefore I have provided this set-screw 51 above referred to. By referring to Fig. 4 it will be seen that the hydrant member 40 has marked upon it a centering or indicating line 60. When the collar 24 has been screwed on to the hydrant portion 40, and then is unscrewed slightly, as explained, so as to bring the set-screw 51 against the shoulder 44 of the underlying hydrant member, the indicating or centering line marked A on the collar and extending through the center of the set-screw, is then directly in alinement with the centering line 60. In such position of the coupling member 40 and collar 24, the internal segment threads 54 and 55 of the collar 24 are set in their proper positions relatively to the pin 46 of the hydrant member 40, such that the other coupling member 32 may then be inserted properly. That is, its segmental threads 34 and 35, if inserted into the intervening spaces 56 between the threads 54 and 55, will result in the slot 36 engaging over the pin 46, and thus the parts are properly put together preparatory for coupling. In order that this alining may be still further assisted without observing the relative positions of the segmental threads 34 and 35, I have found it convenient to mark a still further centering or indicating line upon the other coupling member. This mark is not shown upon the coupling member 32 but it is shown upon the hydrant cap or plug 70 which is illustrated in Figs. 4 and 6. The formation of this plug or cap 70 is just like that of the coupling member 32. In fact it is a coupling member in itself, having the regular segmental threads 34 and 35 and gaskets 38 and slot 36 shown in dotted lines in Fig. 6. A centering line A is also marked on this cap as shown in Fig. 4 so that when these lines are all in alinement as shown in Fig. 4, the operator knows that the parts are then in the proper position for bringing them together and coupling the same by rotation of the collar 24 as explained.

A chain 71 holds the plug 70 loosely attached to the hydrant member when the plug is removed. The set-screw 72 (Figs. 4 and 8) is for the purpose of holding the hydrant member 40 in place after it has been screwed on to the hydrant.

The work of pulling together the two coupling members may be principally borne by the segmental threads 34, 54 and 35, 55, in case the pitch of the thread 50 is low, or such work may be divided up between the said threads 50 and the pairs of mutilated threads. Or the work of pulling the coupling members together may be wholly borne by the threads 50 and 42, in which case it will be possible to use the modified form of unlocking device shown in Fig. 9. In this case the coupling member 32 is shown formed with a pair of interlocking blocks 80 (located on diametrically opposite sides of the periphery), and the collar 24 is provided with a corresponding pair of interlocking blocks 81. These blocks with their intervening open spaces correspond to the aforesaid segmental threads 34, 54 and 35, 53, the parts being put together preparatory to coupling by having the blocks 80 and 81 out of alinement. Then when the collar 24 is rotated for coupling the parts together, the blocks 81 slide in back of their respective blocks 80 so that the member 32 is then locked to the collar 24 so far as outward or longitudinal movement is concerned, and the inward movement of the collar 24 produced by the screwing up of the thread 50 upon the thread 42 of the hydrant member 40, will then pull the collar member 32 along together. For convenience in taking up wear or for permitting proper interlocking engagements of said blocks 80 and 81, their engaging surfaces are beveled as at 82. It will of course be understood that the blocks are of such peripheral extent as to maintain the locking engagement over a substantial fraction of revolution of the collar 24, this movement of revolution of the collar 24 until its stopping place is reached, not being sufficient to carry the blocks again out of alinement. And the same centering or alining devices may be used preparatory to setting the parts ready for coupling.

The improvements above described permit quick assembling of the parts ready for coupling, and a quick and secure coupling by the slight rotation of the collar 24. The numerous advantages residing in such a structure will be apparent to those familiar with mechanisms of this sort particularly as applied to hose coupling but also having many uses in connection with other forms of appliances where it is desired to couple together confronting members in a quick and secure manner.

While the forms of devices above set forth are peculiarly well adapted to accomplish the objects sought, it is to be understood that the invention is not limited to the specific details thereof but is capable of embodiment in other forms all coming within the scope of the claims which follow.

What is claimed is as follows:

1. In a coupling device, the combination with two coupling members, of a locking member coöperating therewith and having screw threaded connections movably attaching said locking member to one of said coupling members, with segmental interlocking screw thread portions carried respectively by said locking member and the second coupling member, said segmental interlocking portions being mutually spaced to permit the coupling members to be assembled with said interlocking threads normally out of alinement but to be brought into engaging and interlocking position upon the coupling movement of said locking member; and a slot and pin connection between said coupling members to prevent relative rotary movement thereof; and alining means for alining said coupling members and locking member with said segmental threaded portions in their normal positions out of alinement preparatory to the coupling movement of the locking member, and at the same time effecting the connection of said connecting means between said two coupling members.

2. In a coupling device, the combination with two coupling members, of a locking member coöperating therewith and having connections movably attaching said locking member to one of said coupling members, with segmental interlocking screw thread portions carried respectively by said locking member and the second coupling member, said segmental interlocking portions being mutually spaced to permit the coupling members to be assembled with said interlocking threads normally out of alinement but to be brought into engaging and interlocking position upon the coupling movement of said locking member; and a slot and pin connection between said two coupling members to prevent relative rotary movement thereof; and an alining device comprising a blocking obstruction to position the locking member upon the first coupling member, with indicating devices carried by said locking member and said second coupling member to aline all of the parts in position to cause the engagement of said slot and pin connections and at the same time assemble the segmental threaded portions out of alinement preparatory to coupling.

3. A coupling device comprising two coupling members, and a locking member coöperating therewith and having screw-threaded connections movably attaching one of said coupling members and having interlocking screw threads adapted to engage corresponding screw threads on the other member, whereby said locking member is adapted to move longitudinally with respect to both of said coupling members upon the coupling movement thereof, in combination with means for preventing relative rotary movement of said coupling members in the coupling movement of said locking member.

In testimony whereof I affix my signature in the presence of two subscribing witnesses.

MORRIS A. MARTIN.

Witnesses:
WILLIAM O. GRAY,
E. J. GRAEF.

Copies of this patent may be obtained for five cents each, by addressing the "Commissioner of Patents, Washington, D. C."